US006327346B1

(12) United States Patent
Infosino

(10) Patent No.: US 6,327,346 B1
(45) Date of Patent: Dec. 4, 2001

(54) METHOD AND APPARATUS FOR SETTING USER COMMUNICATION PARAMETERS BASED ON VOICE IDENTIFICATION OF USERS

(75) Inventor: William J. Infosino, Watchung, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/145,073

(22) Filed: Sep. 1, 1998

(51) Int. Cl.[7] .............................. H04M 1/64; H04M 3/42
(52) U.S. Cl. .................... 379/88.02; 379/201.1; 379/207.13; 379/93.03
(58) Field of Search .......................... 379/88.01, 88.02, 379/88.03, 88.21, 88.17, 88.13, 88.25, 389, 390, 395, 201.1, 207.13, 93.03

(56) References Cited

U.S. PATENT DOCUMENTS

| | | | | |
|---|---|---|---|---|
| 5,201,068 | * | 4/1993 | Kawashima ........................ | 455/575 |
| 5,566,229 | * | 10/1996 | Hou et al. ........................ | 379/88.02 |
| 5,623,539 | * | 4/1997 | Bassenyemukasa et al. .... | 379/88.02 |
| 5,761,290 | * | 6/1998 | Farris et al. ..................... | 379/207 |
| 5,781,625 | * | 7/1998 | Sizer, II ............................ | 379/257 |
| 5,825,865 | * | 10/1998 | Oberlander et al. ............... | 379/211 |
| 5,912,949 | * | 6/1999 | Chan et al. ....................... | 379/88.03 |
| 5,917,891 | * | 6/1999 | Will .................................. | 379/88.03 |
| 5,924,070 | * | 7/1999 | Ittycheriah et al. ............... | 704/275 |
| 6,038,305 | * | 3/2000 | McAllister et al. ............... | 379/207 |
| 6,075,983 | * | 6/2000 | Kumagai .......................... | 455/410 |
| 6,101,242 | * | 8/2000 | McAllister et al. ............... | 379/88.02 |

\* cited by examiner

*Primary Examiner*—Fan Tsang
*Assistant Examiner*—Ovidio Escalante
(74) *Attorney, Agent, or Firm*—Oliff & Berridge, PLC

(57) ABSTRACT

The present invention provides a method and apparatus for customized call processing based on voice identification of users. In the present invention, each user is registered as a user of a user device in a user profile database. When a user activates the user device and speaks into the audio receiver of the user device, a voice input message is sent to a customized service processor. The voice input message includes a header that contains an identifier that identifies the user device. The customized service processor searches the user profile database for the entry(s) corresponding to the identity of the user device. Once found, the customized service processor extracts voice pattern features from the received voice input message and compares the extracted voice pattern features against the pre-stored voice pattern features for each of the registered users of the user device. If a match is found within a predetermined tolerance, the corresponding communication settings stored in the user profile database are used to set the communication parameters. If a match is not found, default settings are used to set the communication parameters.

21 Claims, 4 Drawing Sheets

METHOD AND APPARATUS FOR SETTING USER COMMUNICATION PARAMETERS BASED ON VOICE IDENTIFICATION OF USERS

BACKGROUND OF THE INVENTION

1. Field of Invention

The present invention is directed to a method and apparatus for providing customized call processing based on the identification of users using voice recognition.

2. Description of Related Art

Currently, when a call from a user device is processed, a call processor uses settings that are preset according to subscribed services for the user device from which the call is placed. Communication parameters of the call are not altered based on a user using the user device. Thus, if potentially more than one person uses the user device, each must use the user device settings preset for the subscribed services or the communication parameters must be explicitly changed. Thus, new technology is required to provide customized service based on an identity of a user.

SUMMARY OF THE INVENTION

The present invention provides a method and apparatus for customized call processing based on voice identification of users. Each user is registered as a user of a user device in a user profile database. The registration of the users requires that the user provide a sample voice pattern, having sample voice pattern features, and preferred communication settings. The sample voice pattern features and the preferred communication settings are used to set communication parameters when the user uses the user device.

When a user activates the user device and speaks into an audio receiver of the user device, the voice input is converted into a voice input message and is sent to a customized service processor. The voice input message includes a header signal that contains an identifier that identifies the user device. The identifier may be, for example, the telephone number, IP address, mobile identification number, and the like, of the user device.

The customized service processor searches the user profile database for the entry(s) corresponding to the identity of the user device. Once found, the customized service processor extracts the voice pattern features from the received voice input message and compares the extracted voice pattern features against pre-stored voice pattern features for each of the registered users of the user device. If a match is found within a predetermined tolerance, the corresponding communication settings stored in the user profile database are used to set the communication parameters. If a match is not found, default settings are used to set the communication parameters.

BRIEF DESCRIPTION OF THE DRAWINGS

The invention is described in detail with reference to the following figures wherein like numbers designate similar items, and wherein.

DETAILED DESCRIPTION OF PREFERRED EMBODIMENTS

Figure 1:
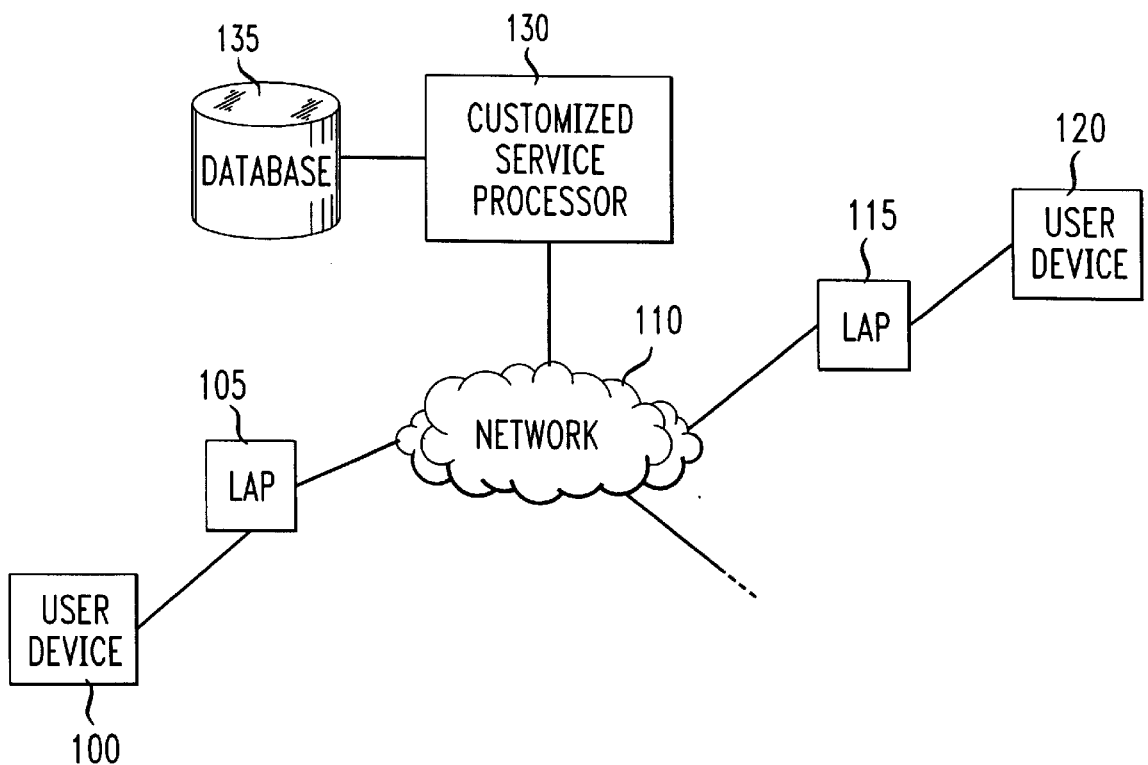
FIG. 1 is a block diagram of a customized service processing system.

FIG. 1 is an exemplary block diagram of a customized service processing system according to a preferred embodiment of the present invention. As shown in FIG. 1, the system includes a plurality of user devices 100 and 120, local access providers (LAPs) 105 and 115, at least one network 110, a customized service processor 130 and user profile database 135.

The user devices 100 and 120 may be any type of device that facilitates voice communication. For example, the user devices 100 and 120 may be land-line telephones, cellular telephones, computers equipped with microphones, a voice recognition device, speech synthesis device and the like. The user devices 100 and 120 include an audio receiver for receiving voice input. The audio receiver may be, for example, a microphone, telephone handset, and the like. The user devices 100 and 120 convert the received voice input into voice input messages that may include, for example, analog voice or voice data signals, and which are then transmitted to the customized service processor 130. The conversion of the voice input into analog voice or voice data signals is performed in any known manner.

The user devices 100 and 120 are in communication with the network 110 through LAPs 105 and 115 over telecommunications links. These telecommunications links may be any type of connection that allows the transmission of information. Some examples include conventional telephone lines, fiber optic lines, wireless communication links, direct serial connection, and the like.

The network 110 may be any type of telecommunications network or combination of telecommunications networks that facilitate voice communication from a calling party user device 100 to a called party user device 120. For example, the network 110 may be a local Bell Atlantic telephone network in communication with an AT&T long distance telephone network. Similarly, the network 110 may be a data network, such as the Internet, a wide area network (WAN), a local area network (LAN) and the like, or a data network in communication with a telecommunications network.

The network 110 includes at least one customized service processor 130 that receives the voice input message from a calling party user device 100 and identifies an individual party based on the voice input message. The customized service processor 130 may be a single processor or may be part of a distributed processing system incorporated into the network 110. The customized service processor 130 has access to at least one user profile database 135 that stores information pertaining to the preferred communication settings of registered users.

As an example of the overall operation of the customized service system shown in FIG. 1, assume that the user device 100 is located in a place where a number of known users may make use of the user device 100. Such a situation often occurs in a home setting in which a number of family members or roommates have access to a user device, such as a telephone. Likewise, a similar situation occurs in small businesses in which the employees have access to the business' telephone. In these situations, each user has his/her own preferred settings for the communication settings and thus, would like the settings of the user device 100 to be automatically adjusted to their preferred settings when they are using the user device 100.

In order to accomplish this objective in the present invention, each of the users is registered as a user of the user device 100 in the user profile database 135. The registration of the users requires that the user provide a sample voice pattern, having sample voice pattern features, and their preferred communication settings. The sample voice pattern features and the preferred communication settings are subsequently used in setting the communication parameters for communications in which the particular user is a party.

When a user activates the user device 100 and speaks into the audio receiver of the user device 100, the user device 100 converts the voice input into a voice input message which is sent to the customized service processor 130 through LAP 105 and network 110. The conversion of the voice input into a voice input message may be performed in any known manner. For example, when the network 110 includes a telecommunications network, the voice input may be converted using known telephone circuitry to convert the voice input into digitized voice data that is transmitted across the network 110 in the form of a voice input message. Alternatively, when the network 110 includes a data network, the voice input may be converted using conventional voice digitizing techniques, for example.

The voice input message also includes a header that containing an identifier that identifies the user device 100. The identifier may be, for example, the telephone number, IP address, mobile identification number, and the like, of the user device 100.

Upon receiving the voice input message, the customized service processor 130 searches the user profile database 135 for the entry(s) corresponding to the identity of the user device 100. Once found, the customized service processor 130 extracts voice pattern features from the received voice input message and compares the extracted voice pattern features against pre-stored voice pattern features for each of the registered users of the user device 100. If a match is found within a predetermined tolerance, the corresponding communication settings stored in the user profile database 135 are used to set the communication parameters. If a match is not found, default settings are used to set the communication parameters.

The settings may be, for example, a preferred volume level of the output of the user device 100, an enabling/disabling of call waiting or other services available to the user device 100, enabling/disabling of call blocks, separate billing statements, providing an indication of the party having been involved in the communication on a monthly statement, a limit on the amount of communication time, and the like. Any type of setting may be included in the communication settings used by the present invention without departing from the spirit and scope of the present invention.

The default settings may be, for example, the settings of the owner of the user device 100 or may be a separate set of settings included in the user profile database 135. The default settings may also be the settings to which the user device 100 is returned when the instant communication session is terminated. Thus, once the settings have been adjusted for the identified user and the user terminates the communication, the settings may be returned to the default until the next communication session when the settings may be again adjusted depending on the identified user.

In order to set the communication parameters for the communication based on the identity of the user, the customized service processor 130 sends command signals to switches (not shown) in the network 110 and the user device 100 instructing them to change their communication parameters. For example, the settings in the user profile database 135 may indicate that the volume of the user device 100 be increased and that call waiting be disabled. In this case, the customized service processor 130 sends a command signal to the network 110 switch (not shown) handling the communication, instructing the switch to disable call waiting. The customized service processor 130 also sends a command signal to the user device 100 instructing the user device 100 to increase the volume of the user device 100 to the volume level set in the user profile database 135.

Figure 2:
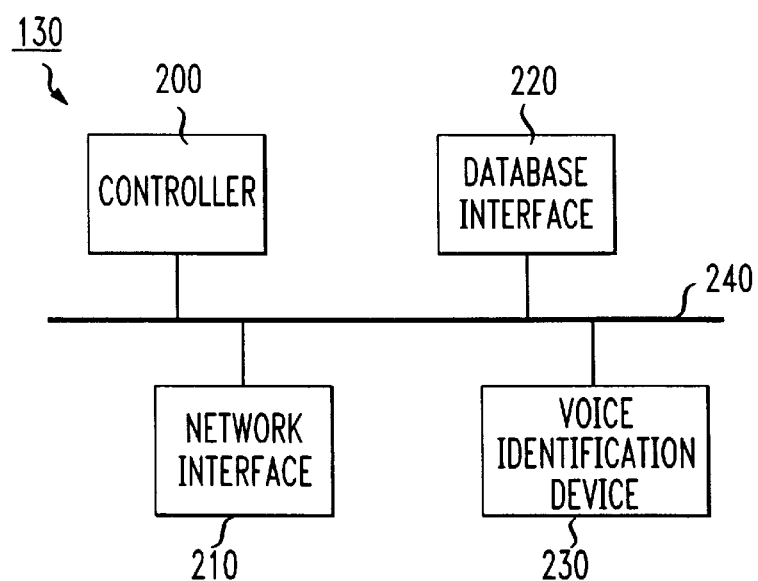
FIG. 2 is a block diagram of the customized service processor of FIG. 1.

FIG. 2 is a block diagram of the customized service processor 130 of FIG. 1. As shown in FIG. 2, the customized service processor 130 includes a controller 200 that controls the operation of the customized service processor 130, a network interface 210 that provides a communication pathway between the controller 200 and the network 110, a database interface 220 that facilitates the retrieval of information from the user profile database 135, and a voice identification device 230 that extracts voice pattern features from the received voice message and compares the extracted voice pattern features against pre-stored voice pattern features in the user profile database 135 to identify a user of the user device 100. Each of these devices are in communication with one another via the bus 240.

When a user activates user device 100, for example, and speaks into the audio receiver of the user device 100, the voice input is converted to a voice input message which is sent to the customized service processor 130. The activation of the user device 100 may be performed, for example, when attempting to establish a communication connection with user device 120 or may be performed, for example, when receiving a communication attempt from the user device 120.

The voice input message is received by the controller 200 through the network interface 210. The controller 200 receives the voice input message containing a header and searches the user profile database 135 for an entry corresponding to the user device identifier contained in the header, through database interface 220. If an entry is found, the controller 200 retrieves the voice pattern features from the entry in the user profile database 135 and forwards the voice pattern features along with the received voice input message to the voice identification device 230.

The voice identification device 230 extracts voice pattern features from the received voice input message and compares the extracted voice pattern features with the voice pattern features retrieved from the user profile database 135. If a match is found within a predetermined tolerance, the voice identification device 230 provides the identity of the match to the controller 200. The controller 200 then retrieves the communication settings associated with the user identified by the voice identification device 230 and issues command signals to set the communication parameters in accordance with the user's communication settings.

Figure 3:
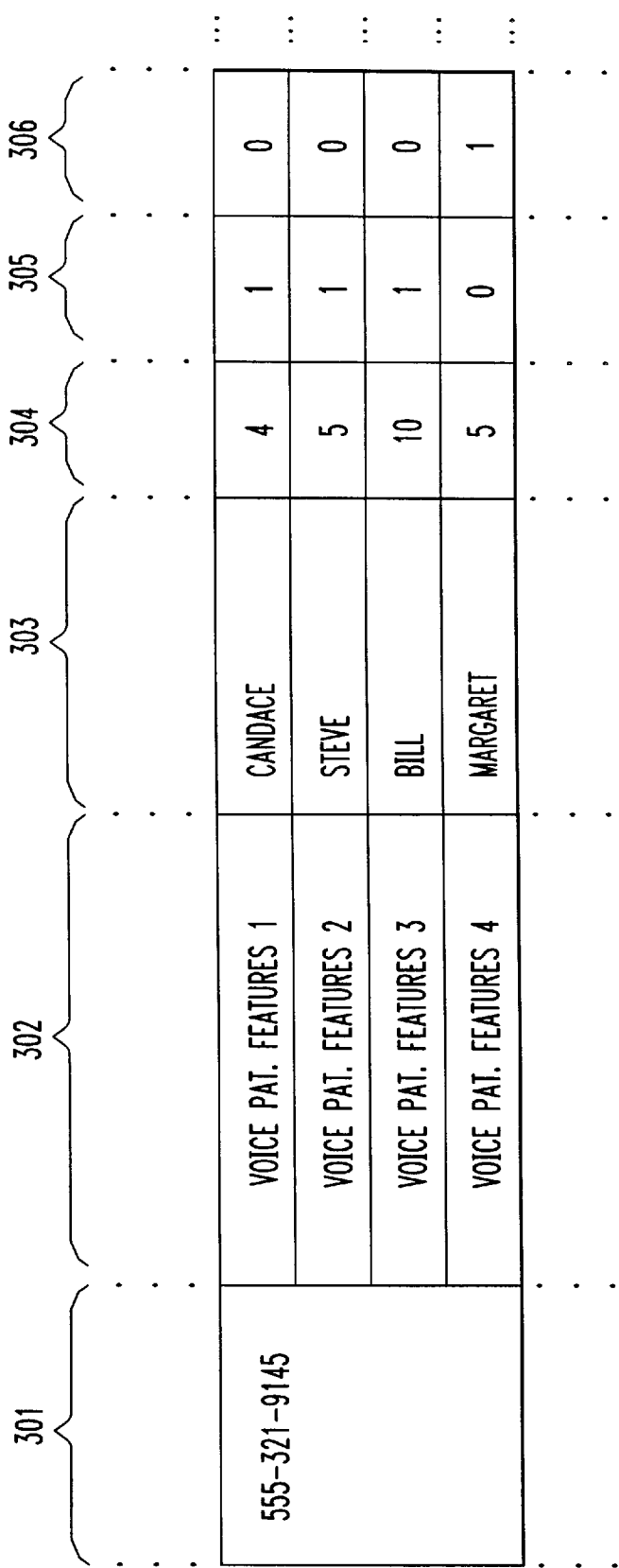
FIG. 3 is an exemplary diagram of a data structure of the database of FIG. 1.

FIG. 3 is a diagram of an exemplary data structure of the user profile database 135. As shown in FIG. 3, the data structure contains a field 301 for the user device identifier, a field 302 for the voice patterns of each registered user of the user device having the user device identifier in field 301, a field 303 for a user identifier, a field 304 for a volume setting (for example, on scale from 1 to 10, 10 being the loudest), a field 305 for a call waiting on/off setting (for example, 1 being on and 0 being off) and a field 306 for a toll call block on/off setting (for example, 1 being on and 0 being off). These fields are illustrative and not limiting. Other fields and corresponding information may be included in the data structure without departing from the spirit and scope of the present invention.

When the controller 200 receives the voice input message with the header having a user device 100 identifier, for example, the controller 200 searches field 301 for the occurrence of the user device 100 identifier. Once an entry is found containing the user device 100 identifier, the controller 200 retrieves the voice pattern features stored in field 302 for each of the registered users of the user device 100. The retrieved voice pattern features and the voice input message received from the user device 100 are forwarded to the voice identification device 230. If the voice identification device 230 identifies a match between one of the retrieved voice pattern features and voice pattern features extracted from the received voice input message, the settings in fields 304, 305 and 306 are used to send command signals to set the communication parameters of the current communication. The user identifier in field 303 may be used, for example, to provide individualized billing of the communication or identification of the party involved in the communication on a monthly statement.

Figure 4:
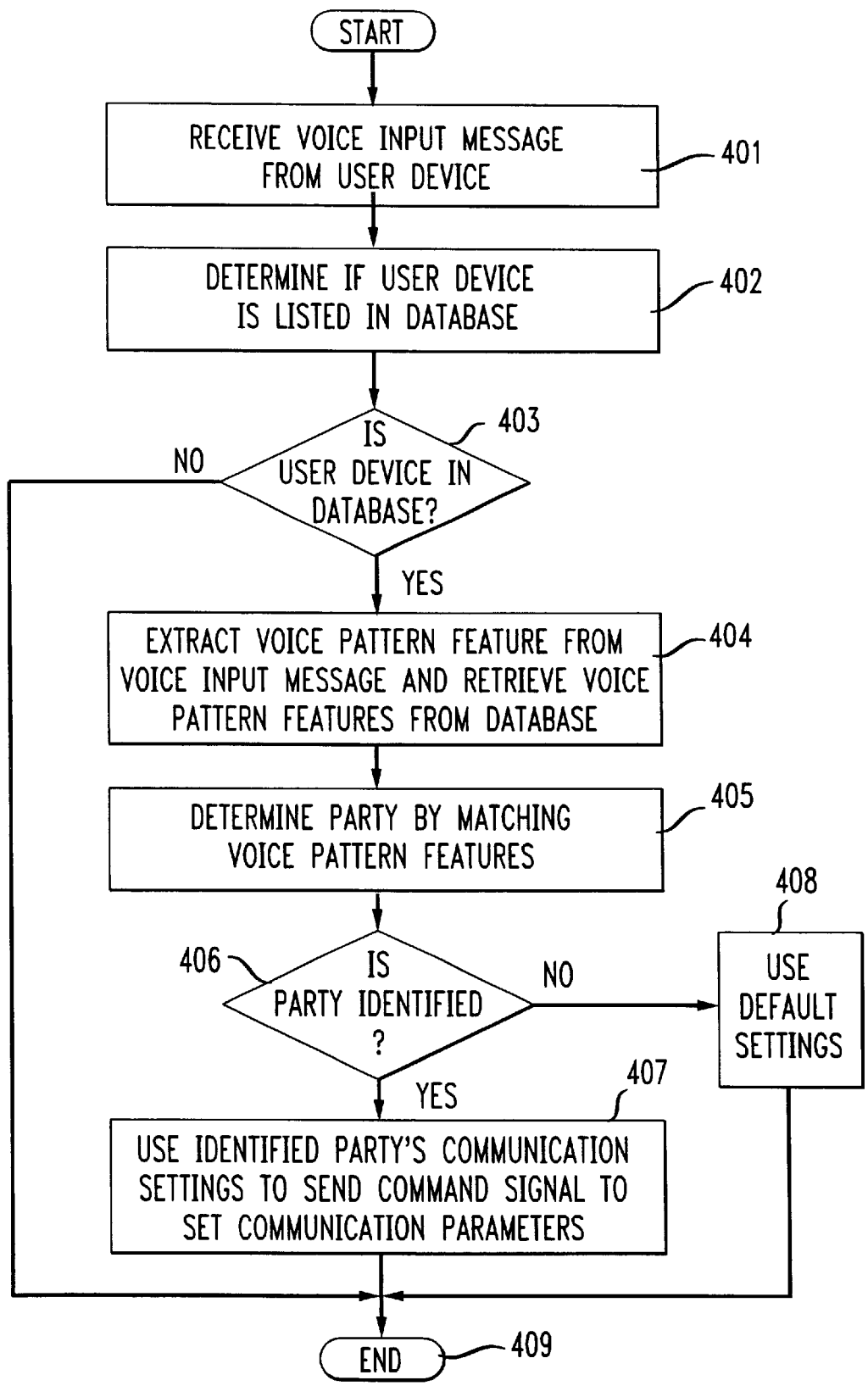
FIG. 4 is a flowchart of the operation of the customized service processor of FIG. 2.

FIG. 4 is a flowchart of the operation of the customized service processor 130 of FIG. 1. As shown in FIG. 4, in step 401 the controller 200 receives the voice input message from the user device 100, for example, and goes to step 402. The voice input message includes a header and voice input signals input by a user of the user device 100.

In step 402, the controller 200 searches the user profile database 130 to determine if a user device 100 identifier contained in the header signal is listed in the user profile database 135. In step 403, if the user device 100 identifier is in the user profile database 135, the controller 200 continues to step 404; otherwise the controller 200 goes to step 409 and takes no action.

In step 404, the controller 200 retrieves the voice pattern features from the user profile database 135 corresponding to the user device 100 identifier and forwards them along with the received voice input message to the voice identification device 230. The voice identification device 230 extracts voice pattern features from the received voice input message and goes to step 405. In step 405, the voice recognition device 230 determines if the extracted voice pattern features match any of the voice pattern features retrieved from the database 135.

In step 406, if a match is found within a predetermined tolerance, the controller 200 goes to step 407; otherwise the controller 200 goes to step 408 where default communication settings are used for the current communication and thus, requires no further action. In step 407, the controller 200 uses the communication settings corresponding to the party identified by the voice identification device 230 to send command signals to set the communication parameters for the current communication, goes to step 409 and ends.

As a practical example of the above embodiment, assume that Bill wishes to call Ted using the telephone (user device) 100. Bill picks up the handset of his telephone and dials the telephone number for Ted's telephone (user device) 120. The call is routed by way of LAPs 105 and 115 and switches within the network 110 through the customized service processor 130 to Ted's telephone 120. When the customized service processor 130 receives a voice input message from Bill's telephone 100, such as when Bill begins speaking to Ted, the customized service processor 130 extracts voice pattern features from the received voice signals and compares them against the voice pattern features stored in the user profile database 135 corresponding to the user device identifier in the header of the voice input message. If a match is found within a predetermined tolerance, the communication settings are then used to send command signals to the network 110 and Bill's telephone 100 to change the communication parameters of the communication connection between Bill and Ted. For example, the customized service processor 130 may send a command signal to Bill's telephone 100 instructing that the volume of the output audio signals of Bill's telephone be increased. Likewise, the customized service processor 130 may send a command signal to the network 110 switch that is handling Bill's call, instructing the switch that call waiting is to remain enabled and toll call blocking is not to be enabled. Furthermore, when Bill receives his monthly billing statement, the communication may be included in a separate statement for Bill or Bill may be indicated as the household party involved in the communication.

Alternatively, rather than having to wait until a communication connection is established between Bill and Ted before obtaining a voice input message, the customized service processor 130 may obtain a voice input message before attempting to complete the communication connection. For example, after Bill enters the telephone number for Ted's telephone 120, Bill's telephone may send a signal indicating the identity of Bill's telephone, such as Bill's telephone number, and the identity of Ted's telephone. When the customized service processor 130 receives the signal from Bill's telephone, the customized service processor 130 may determine if Bill's telephone is listed in the user profile database 135 using the identifier for Bill's telephone. If Bill's telephone is listed in the database 135, the customized service processor 130 may send a request message to Bill requesting "Please speak your name for identification." When Bill speaks his name, the customized service processor 130 receives the voice input message and extracts voice pattern features that are compared to the voice pattern features stored in the user profile database 135. In this way, the communication parameters may be established before the attempt is made to complete the communication connection to Ted.

As another embodiment, the voice identification device 230 may receive the voice input message, extract voice pattern features and compare them against a generalized list of recognizable words. For example, the voice identification device 230 may extract voice pattern features, compare them to a list of voice pattern features stored in a memory (not shown) and determine that the word "David" was spoken by the calling party. The voice identification device 230 may then send the recognized word to the controller 200 which then searches the user profile database 135 for the occurrence of that recognized word. For example, the controller 200 may search field 303 of the user profile database 135 for the occurrence of the word "David" and retrieve the communication settings associated with the entry in which the word "David" occurs. This embodiment requires that keywords be established in the user profile database 135 for identification of the individual users of the user device 100.

Figure 5:
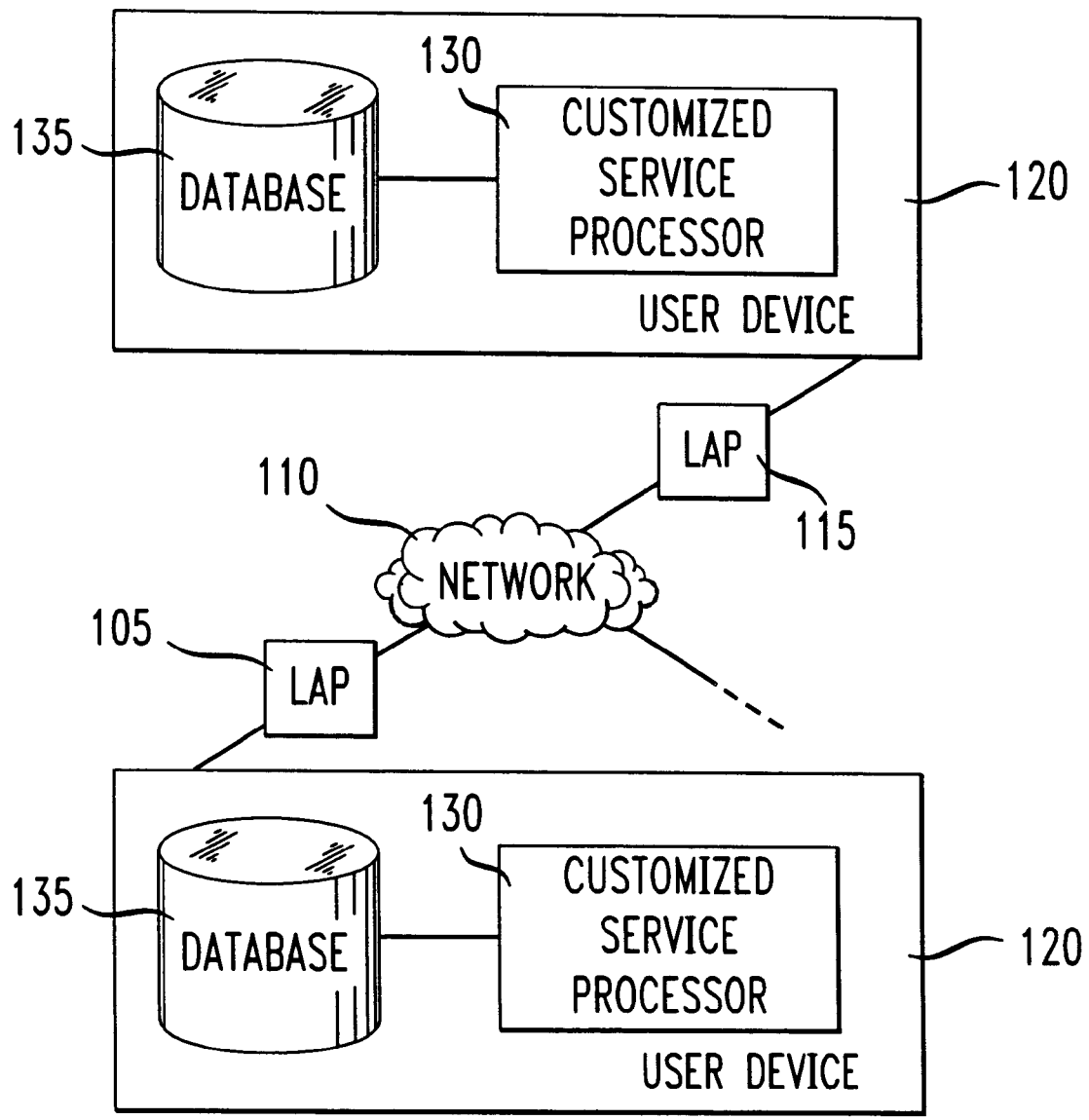
FIG. 5 is a block diagram of a user communication device including the customized service processor of FIG. 1.

While the above embodiments, for purposes of explanation, describe the customized service processor 130 as being a separate device in communication with the network 110, the customized service processor 130 may be, for example, incorporated into the LAP 105 or the user device 100. FIG. 5 shows an example in which the customized service processor 130 is incorporated within the user device 100, along with the user profile database 135 coupled to the customized service processor 130.

If the customized service processor 130 is incorporated into the user device 100, the user profile database 135 includes entries for the registered users of the user device 100 only. In such an embodiment, the voice input message need not be transmitted through the network 110 before identification of the user is performed. For example, when the user activates the user device 100 and enters the identifier for the user device 120, the user device 100 may send a message to the user via an audio output device to "Please speak your name for identification." The user's response is thus, not transmitted to the network 110 but rather is processed locally at the user device 100. Once it is determined whether or not the voice pattern features of the user's voice input message matches voice pattern features stored in the user profile database 135, the customized service processor 130 of the user device 100 determines the communication parameters using the settings in the user profile database 135 and attempts to complete the communication connection with the user device 120. Once the communication connection is established, the voice signals input to the user device 100 are then transmitted to the user device 120 via the LAPs 105 and 115 and the network 110.

Additionally, while the above embodiments, for purposes of explanation, describe the invention wherein the user profile database 135 is coupled to the customized service processor 130, the invention is not limited to such an arrangement. The user profile database 135 may be located remotely from the customized service processor 130.

For example, the user device 100 may extract voice pattern features from received voice input, retrieve information from a remotely located user profile database 135 corresponding to the extracted voice pattern features and the identity of the user device 100 and send codes to the customized service processor 130 indicating the settings for the communication. The customized service processor 130 may then receive the codes and send command signals to the network switch to change the communication parameters. The settings for the user device 100 may be changed automatically by the user device 100 once it has retrieved the settings from the user profile database 135.

As shown in FIGS. 1 and 2, the method of this invention is preferably implemented on a programmed processor or programmed processors. However, the customized service processor 130 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 4 can be used to implement the customized service functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of setting user communication parameters for a communication between a voice calling party and a called party, comprising:

establishing said voice communication between the calling party and the called party;

receiving a first user identification from a user during the communication;

retrieving at least one second user identification from a user profile database;

comparing the first user identification and the at least one second user identification, the comparing step determining if the first user identification matches the at least one second user identification within a predetermined tolerance, and identifying a user if the first user identification and the at least one second user identification match within the predetermined tolerance; and setting the user communication parameters based on a result of the comparison step, the setting step including retrieving preferred communication setting information from the user profile database corresponding to the identified user.

2. The method of claim 1, wherein the first user identification and second user identification are at least one of voice pattern features and keywords.

3. The method of claim 1, further comprising receiving a user device identifier from the user device, wherein the step of retrieving at least one second user identification includes retrieving the at least one second user identification from an entry in the user profile database that corresponds to the received user device identifier.

4. The method of claim 3, wherein the user device identifier includes at least one of a telephone number, a mobile identification number and an IP address.

5. The method of claim 1, wherein the step of setting the communication parameters includes sending command signals to at least one of the user device and a network switch instructing the at least one of the user device and the network switch to change the communication parameters.

6. The method of claim 5, wherein the communication parameters include one of setting of a preferred volume level of the output of the user device, enabling of a call waiting service, disabling of a call waiting service, enabling of a subscribed service, disabling of a subscribed service, enabling of call blocks, disabling of call blocks, providing separate billing statements, providing an indication of the party having been involved in the communication on a monthly statement, and limiting the amount of communication time available.

7. A method of setting user communication parameters according to claim 1, wherein the user is the called party.

8. A method of setting user communication parameters according to claim 1, wherein the user is the calling party.

9. An apparatus for setting communication parameters for a voice communication between a calling party and a called party, comprising:

a controller; and a user profile database that stores at least one user profile, wherein the controller establishes said voice communication between the calling party and the called party, receives a first user identification from the user during the communication, retrieves at least one second user identification from the user profile database, compares the first user identification and the at least one second user identification by determining if the first user identification matches the at least one second user identification within a predetermined tolerance, and identifying a user if the first user identification and the at least one second user identification match within the predetermined tolerance, and sets communication parameters based on a result of the comparison of the first user identification and the at least one second user identification by retrieving preferred communication setting information from the user profile database corresponding to the identified user.

10. The apparatus of claim 9, wherein the first user identification and the second user identification are at least one of voice pattern features and keywords.

11. The apparatus of claim 9, wherein the controller receives a user device identifier from the user device and retrieves the at least one second user identification from an entry in the user profile database that corresponds to the received user device identifier.

12. The apparatus of claim 11, wherein the user device identifier includes at least one of a telephone number, a mobile identification number and an IP address.

13. The apparatus of claim 9, wherein the controller sets the communication parameters by sending command signals to at least one of a user device and a network switch instructing the at least one of the user device and the network switch to change the communication parameters.

14. The apparatus of claim 13, wherein the communication parameters include one of setting of a preferred volume level of the output of the user device, enabling of a call waiting service, disabling of a call waiting service, enabling of a subscribed service, disabling of a subscribed service, enabling of call blocks, disabling of call blocks, providing separate billing statements, providing an indication of the party having been involved in the communication on a monthly statement, and limiting the amount of communication time available.

15. The apparatus of claim 9, wherein the user is the called party.

16. The apparatus of claim 9, wherein the user is the calling party.

17. A method of setting user communication parameters for setting a preferred volume level of an output of a user device, enabling a call waiting service or disabling a call waiting service, comprising:

receiving a first user identification from a user;

retrieving at least one second user identification from a user profile database;

comparing the first user identification and the at least one second user identification; and performing at least one of (a) setting a preferred volume level of an output of the user device, (b) enabling a call waiting service and (c) disabling a call waiting service, based on a result of the comparison step.

18. The method of claim 17, wherein the performing at least one of (a) setting a preferred volume level of an output of the user device, (b) enabling a call waiting service and (c) disabling a call waiting service is performed by the user device.

19. An apparatus for setting communication parameters for setting a preferred volume level of an output of a user device, enabling a call waiting service or disabling a call waiting service for a user device, comprising:

a controller; and a user profile database that stores at least one user profile, wherein the controller receives a first user identification from the user, retrieves at least one second user identification from the user profile database, compares the first user identification and the at least one second user identification, performs at least one (a) setting a preferred volume level of an output of the user device, (b) enabling a call waiting service and (c) disabling a call waiting service, based on a result of the comparison step.

20. The apparatus of claim 19, wherein at least one of the controller and the user profile database is incorporated into the user device.

21. An apparatus for setting communication parameters for a user device, comprising:

a controller; and a user profile database that stores at least one user profile, wherein the controller establishes a voice communication between a calling party and a called party via the user device, receives a first user identification from a user during the voice communication, retrieves at least one second user identification from a user profile database, performs a first comparison comparing the first user identification and the at least one second user identification, and sets the user communication parameters by retrieving preferred communication setting information from the user profile database based on a result of the first comparison, wherein at least one of the controller and the user profile database is incorporated into the user device.

* * * * *